United States Patent

[11] 3,617,564

| [72] | Inventors | John Vander Hooven;<br>David I. B. Vander Hooven, both of<br>Maumee, Ohio |
|---|---|---|
| [21] | Appl. No. | 42,444 |
| [22] | Filed | June 1, 1970 |
| [45] | Patented | Nov. 2, 1971 |
| [73] | Assignee | Anderson Cob Mills Incorporated<br>Maumee, Ohio |

[54] REMOVING OIL OR OIL SUBSTANCE FROM WATER AND LAND AREAS USING CORNCOB COMPONENTS
5 Claims, No Drawings

[52] U.S. Cl. .................................................. 210/40, 210/DIG. 21
[51] Int. Cl. ...................................................... B01d 15/00
[50] Field of Search ................................................ 99/2; 210/24, 36, 39, 40, DIG. 21, 502; 424/69

[56] References Cited
UNITED STATES PATENTS

| 2,890,151 | 6/1959 | White | 424/347 X |
|---|---|---|---|
| 3,382,170 | 5/1968 | Pape | 210/36 |

FOREIGN PATENTS

| 979,978 | 1/1965 | Great Britain | 210/DIG. 21 |

Primary Examiner—Reuben Friedman
Assistant Examiner—Thomas G. Wyse
Attorney—Owen & Owen ABSTRACT: Low-density corncob meal is placed on a polluting oil deposit in a body of water or on a land area. The corncob components absorb the oil and the contaminated corncob meal is then removed from the body of water or from the land area.

3,617,564

REMOVING OIL OR OIL SUBSTANCE FROM WATER AND LAND AREAS USING CORNCOB COMPONENTS

BACKGROUND OF THE INVENTION

The present invention relates to a material and a method for removing oil or oily substance from a body of water. The spilling of oil from oil tankers or the discharge or oil from offshore wells creates severe pollution problems. Removing an oil slick from the surface or from the top layer of sea water and the removal of oil wastes from a beach area is a difficult problem.

The prior art has used many methods, the most common being the spreading of straw on the oil slick. While straw is plentiful and relatively inexpensive, it is also relatively ineffective in removing oil from a body of water or from a beach. Straw results in only a partial removal of the oil.

U.S. Pat. No. 3,414,511 discloses the use of expanded vermiculite, namely an exfoliated hydrated magnesium-aluminum-iron silicate, in removing oil from polluted water. Other types of mineral absorbents have also been used. One of these is a treated mineral material sold under the trademark Ekoperl.

After oil has been absorbed by a mineral absorbent, the contaminated mineral absorbent is removed from the body of water. However, a percentage of the mineral material is not removed from the body of water and often finds its way to the bottom of the ocean or lake. If a mineral material is used that does not break down, it is in effect a pollutant itself. It is very important that any material used in the removal of oil not be a pollutant itself and also that such material does not add a severe BOD loading to the body of water which would create an additional pollution or sewage treatment problem.

The present invention uses a product consisting of a corncob meal which is mainly the lighter components of corncobs. These lighter corncob components are obtained by separation after the corncobs are cut, crushed or ground in reduction systems which are known to the art.

Structurally, a corncob may be divided into four parts. These parts are (1) the fine chaff or beeswing (inner glumes and thin upper section of outer glumes); (2) the coarse chaff (lower portion of outer glumes, the kernel caps, and the small stems on which the kernels are borne); (3) the woody ring; and (4) the pith. A breakdown of the structural components of corncobs is defined in *USDA Pamphlet AIC-177* (revised) compiled by the Northern Regional Research Laboratory, Peoria, Illinois Apr., 1953.

Many industrial and other uses of corncobs are well known 966,060 the art. Many of these uses involve the part of the cob identified as the woody ring. This woody ring portion of the corncob has a density normally ranging between 27 pounds and 32 pounds per cubic foot. Grit made from the high-density woody ring has been used in the prior art for many purposes including the polishing and cleaning of dirty and oily metallic parts, for example the cleaning of ball bearings.

As early as 1910, U.S. Pat. No. 966,060 disclosed the use of cob meal combined with sand, heavy mineral oil, disinfectant and perfume as a dust collecting or absorbing substance, especially adapted for use on carpeted floors and rugs.

SUMMARY OF THE INVENTION

The present invention relates to a product and process for removing oil or oily substances from water and beach areas comprising the placing of corncob components having a density of between 5 pounds and 20 pounds a cubic foot upon the oil, absorbing the oil with the corncob meal and removing the contaminated corncob components from the area.

DESCRIPTION OF THE PREFERRED EMBODIMENT

The corncob product according to the present invention is mainly comprised of the lighter components of the corncob which are obtained by separation after the corncobs are cut, crushed or ground. The density of the corncob product varies between 5 pounds and 20 pounds per cubic foot and its size characteristics are shown in the following table.

TABLE

| Screen Size | Analysis (by weight) Cumulative Percentage Retained | |
|---|---|---|
| | Maximum | Minimum |
| 6 | 5% | 0% |
| 60 | 98% | 70% |
| 100 | 100% | 85% |

It has been found that a corncob product according to the present invention, which comprises essentially the lighter components of the corncob, readily absorbs oil or oily contaminants in a proportion of two parts of corncob product to one part of oil (by volume). For example, 12 cubic feet of the corncob product will absorb approximately a barrel 42 gallons) of oil. It has also been found that the heavier components of the corncob, consisting mainly of the "woody ring," when applied to oil or oily contaminants floating on water, do not absorb an appreciable amount of oil and tend to sink to the bottom of the body of water.

When applying the corncob product as part of a method of removing an oil slick, for example, waste oil from a tanker, it has been found that the oil slick normally has a predetermined outer periphery which tends to expand forming a larger and larger area. The preferred method, according to the present invention, is to apply the corncob components, having a density of between 5 and 20 pounds per cubic foot, around the edge or outer periphery of oil slick area. This confines the oil slick and retards its spread. Subsequently, the corncob product is placed over the remaining interior portions of the slick. The corncob product is applied to the oil slick by various means, one of them being a blowing apparatus including a flexible conduit on the discharge side.

The corncob components absorb the oil. The contaminated, oil-soaked, corncob components are then removed from the water. It has been found that the saturated corncob product will float on fresh or salt water. Even when agitated, the oil-saturated corncob product will shortly rise to the surface where it forms clots or agglomerates which can be easily removed by wire mesh scoops, skimmers of various designs, and skimming pumps.

Where a corncob product, according to the present invention, is utilized in clearing water areas, it has been found that the surface tension of the oil is broken on surfaces, such as dock pilings, retaining walls, and boat hulls. This enables the saturated corncob product which tends to cling to these surfaces to be flushed by hosing.

Any oil-saturated corncob component that escapes recovery from the water area remains as a homogenous small mass that in time degrades. This is a very important feature of the present invention. In addition, any corncob component that is applied to a water area and has not absorbed oil and is not removed, tends to absorb water and sink to the bottom. However, it has been found that the corncob component degrades with a very low biochemical oxygen demand. Accordingly, the corncob product according to the present invention is a very effective antipollutant agent.

When the corncob product, according to the present invention, is used on sandy beaches, it has been found to be much more effective than, for example, straw. The corncob component having a density of between 5 pounds and 20 pounds per cubic foot is spread over the oil-covered sand. The corncob component absorbs the oil and holds the oil on the surface of the sand. The oil-saturated corncob component is then removed. This removal process is accomplished by scraping the top surface of the sand or in the alternative by flushing the saturated corncob component from the beach area and skimming it from the water surface adjacent the beach. The latter approach is used where the water area adjacent the beach is already being treated with the corncob components in an attempt to remove the oil from both the water area and the beach area.

It has been found that after corncob components have been applied to an oil slick, there is a reduced likelihood that water fowl or aquatic animals will enter the slick area and in addition when they do enter the oil slick area their chances of survival are better because the surface tension of the oil is broken and the contaminated corncob components may be removed from their bodies by flushing with water.

The oil-saturated corncob components may be disposed of in a landfill area where the agglomerated contaminated components will degrade over a period of time. However, if the oil-contaminated corncob components are disposed of by incineration, it has been found that the corncob component itself will burn with a small residue of less than 2 percent ash.

The present product and method has been found to be very effective in fighting oil spill types of pollution.

What we claim is:

1. A method for removing oil or oily substances from the surface or upper layer of a body of water, comprising spreading an absorbent consisting essentially of corncob components excluding all but trace amounts of the woody ring component, the absorbent having a density of between 5 pounds and 20 pounds per cubic foot upon the oil, absorbing the oil or oily substance with the absorbent, and removing the oil-contaminated corncob components from the water.

2. A method according to claim 1 wherein the oil or oily substance defines a configuration having an outer periphery on the surface of the water, comprising surrounding the outer periphery of the oil configuration with a band of the corncob components to limit the spreading of the oil, placing the corncob components over the remainder of the oil configuration, and removing the oil-contaminated components from the water.

3. Material for use in removing oil or oil substances from water or land areas consisting essentially of corncob components excluding all but trace amounts of the woody ring component, said corncob components having a density of between 5 pounds and 20 pounds per cubic foot and wherein said corncob components are of a size where at least 95 percent pass through a 6-mesh screen and a minimum of 85 percent are retained on a 100-mesh screen.

4. Material according to claim 3, wherein said corncob components include corncob fine chaff, coarse chaff, pith and the trace amounts of woody ring.

5. A method for removing oil or oily substances from the surface or upper layer of a land area, comprising spreading an absorbent consisting essentially of corncob components excluding all but trace amounts of the woody ring component, the absorbent having a density of between 5 pounds and 20 pounds per cubic foot upon the oil, absorbing the oil or oily substance with the absorbent, and removing the oil-contaminated corncob components from the land area.

* * * * *